United States Patent
Nassor et al.

(10) Patent No.: US 8,812,724 B2
(45) Date of Patent: Aug. 19, 2014

(54) METHOD AND DEVICE FOR TRANSMITTING VARIABLE RATE VIDEO DATA

(75) Inventors: Eric Nassor, Thorigne Fouillard (FR); Frederic Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 1024 days.

(21) Appl. No.: 12/487,348

(22) Filed: Jun. 18, 2009

(65) Prior Publication Data

US 2009/0319682 A1  Dec. 24, 2009

(30) Foreign Application Priority Data

Jun. 19, 2008 (FR) ...................................... 08 54069

(51) Int. Cl.
  *G06F 15/16* (2006.01)
  *H04N 21/234* (2011.01)
  *H04N 21/2343* (2011.01)
  *H04N 7/50* (2006.01)
  *H04N 7/26* (2006.01)

(52) U.S. Cl.
  CPC ... *H04N 21/23406* (2013.01); *H04N 21/23412* (2013.01); *H04N 21/23418* (2013.01); *H04N 21/23424* (2013.01); *H04N 21/234309* (2013.01); *H04N 21/234318* (2013.01); *H04N 21/234345* (2013.01); *H04N 21/23439* (2013.01); *H04N 19/00781* (2013.01); *H04N 19/0026* (2013.01)
  USPC ....................................................... 709/235

(58) Field of Classification Search
  USPC ....................................................... 709/235
  See application file for complete search history.

(56) References Cited

U.S. PATENT DOCUMENTS

| 6,141,380 | A | 10/2000 | Krishnamurthy et al. ........................ 375/240.02 |
| 7,450,514 | B2 * | 11/2008 | Suh ............................ 370/235.1 |
| 2004/0045030 | A1 * | 3/2004 | Reynolds et al. ............. 725/110 |
| 2005/0213502 | A1 * | 9/2005 | Convertino et al. .......... 370/229 |
| 2006/0126713 | A1 * | 6/2006 | Chou et al. ..................... 375/225 |

(Continued)

FOREIGN PATENT DOCUMENTS

WO   WO 2004/064373 A2   7/2004

OTHER PUBLICATIONS

Kang, S.H., et al., "Packet Scheduling Algorithm for Wireless Video Streaming", Packet Video Workshop, 2002.

*Primary Examiner* — Ario Etienne
*Assistant Examiner* — Blake Rubin
(74) *Attorney, Agent, or Firm* — Fitzpatrick, Cella, Harper & Scinto

(57) ABSTRACT

A video consisting of data organized in the form of a plurality of images is transmitted in a communication network. The method comprises a step of coding images with motion compensation, which consists in compressing the images of the video and in creating dependencies between compressed images, a step of scheduling the transmission of packets representing the compressed images, which consists in sending the compressed images over the network in a selected order, and a step of controlling the rate of the video. At least one of reconsidering the selected order of sending already compressed but not yet transmitted images and deleting at least one compressed image is performed at the time of coding a new image. Furthermore, the dependencies between the new image to be compressed and the compressed images are selected by taking into account the reconsidered sending order at the time of coding the new image.

23 Claims, 9 Drawing Sheets

(56) References Cited

U.S. PATENT DOCUMENTS

| | | | |
|---|---|---|---|
| 2006/0245357 A1* | 11/2006 | Ilan | 370/235 |
| 2007/0204320 A1* | 8/2007 | Wu et al. | 725/135 |
| 2007/0288651 A1* | 12/2007 | Nassor et al. | 709/231 |
| 2008/0130739 A1 | 6/2008 | Le Floch et al. | 375/240.01 |
| 2008/0201751 A1* | 8/2008 | Ahmed et al. | 725/109 |
| 2009/0003432 A1* | 1/2009 | Liu et al. | 375/240.01 |
| 2009/0031038 A1* | 1/2009 | Shukla et al. | 709/231 |
| 2010/0074324 A1* | 3/2010 | Qian et al. | 375/240.02 |

* cited by examiner

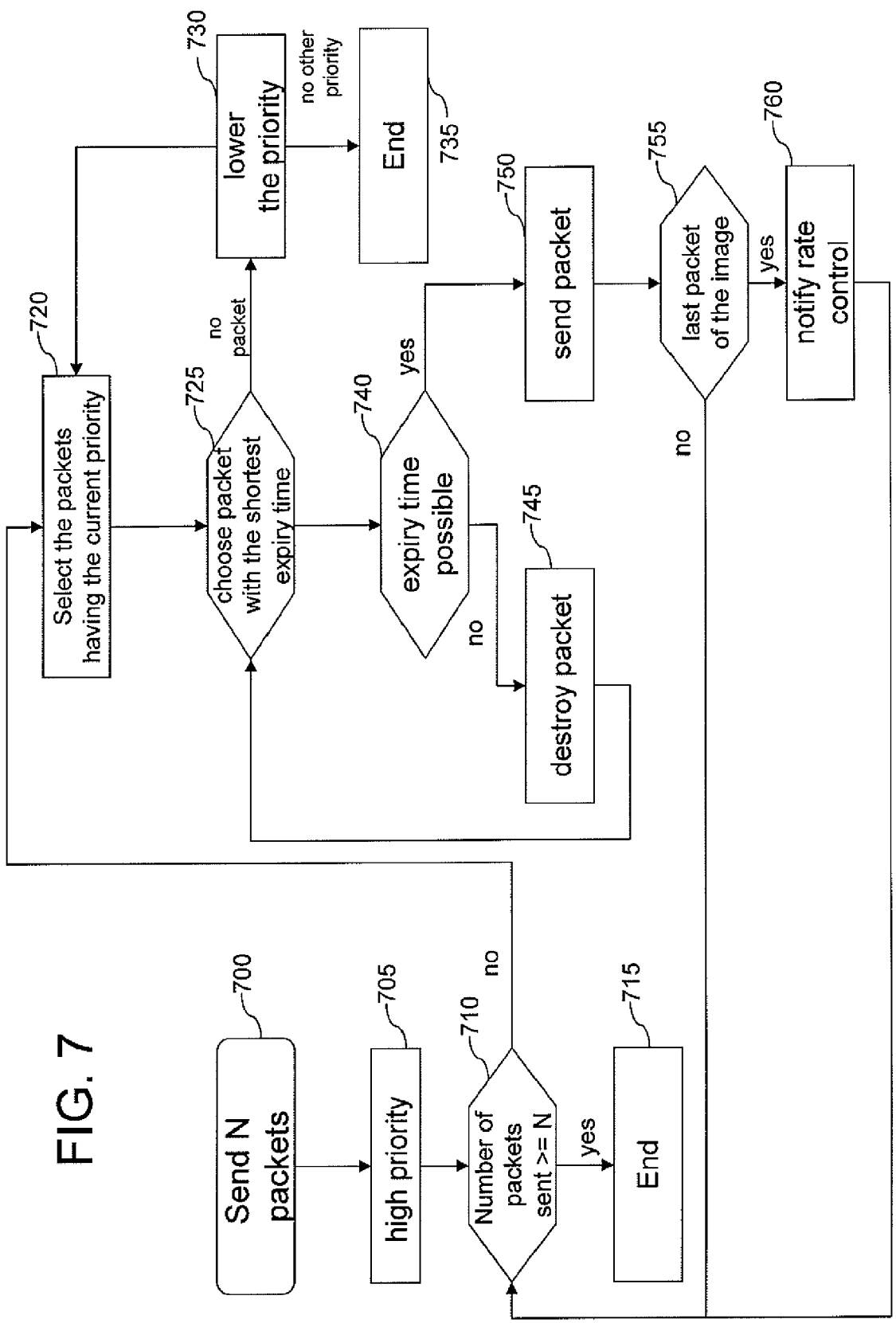

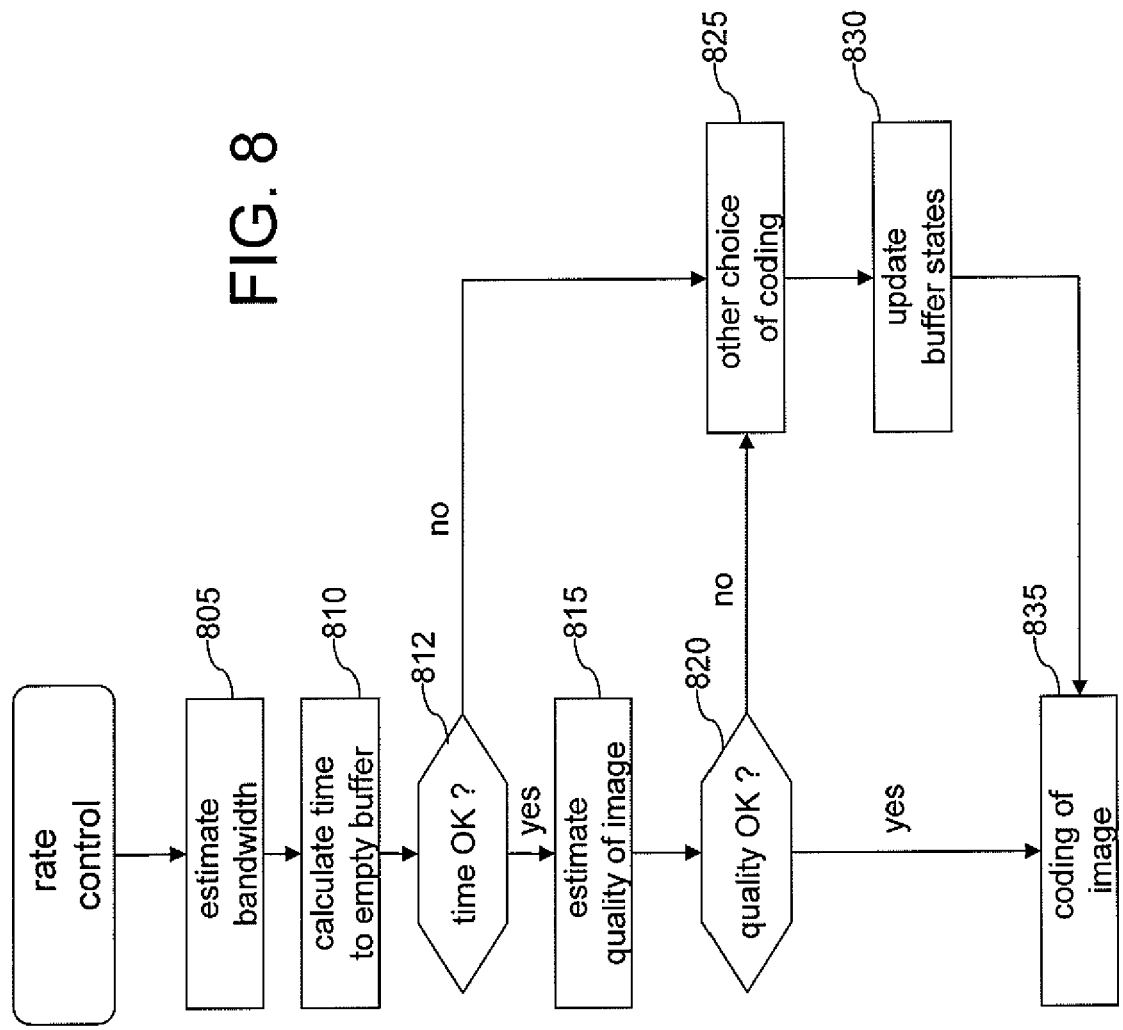

METHOD AND DEVICE FOR TRANSMITTING VARIABLE RATE VIDEO DATA

The present application claims priority of French patent application No. 0854069 of Jun. 19, 2008, which is incorporated herein by reference.

FIELD OF THE INVENTION

The present invention relates to a method and to a device for transmitting data between a server and at least one client in a communication network, and also to a server which carries out such a method.

It belongs to the field of multimedia data transmission in a packet communication network. It applies in particular to the transmission of live video data, which involves the coding of the compressed video with motion compensation and the scheduling of the packets of the video data stream, over a network such as the Internet or local networks of the IP ("Internet Protocol") type.

BACKGROUND OF THE INVENTION

In a digital multimedia data server connected to a communication network, for example a digital video surveillance camera or video-conferencing camera which sends audio and video data, the data is coded in a digital compression format and then stored locally in a buffer memory or storage buffer before being transmitted over the network to one or more clients.

These clients receive and consume this data, for example by playing the video and the audio, as they are received. This is known as multimedia "streaming".

These multimedia streams consist of data such as images or pictures, portions or slices of images or sound samples which exhibit the characteristic of having a limited useful life span, that is, this data must imperatively be received and processed by the receiving peripheral device before a certain expiry time. This expiry time corresponds to the instant at which the data is required to be displayed or played by the client. After this expiry time, the data item becomes useless and is purely and simply ignored by the client.

The multimedia data is compressed so as to be able to be sent over a network with limited bandwidth. This compression degrades the quality of the data, but is necessary in order to adapt the data to the bandwidth of the network. It is therefore important to make the best possible use of the bandwidth of the network so as to compress the data as little as possible and have the best quality.

It is also necessary to avoid modifying the compression rate of the multimedia data too quickly. This is because the quality perceived by the user for data with a rapidly varying compression rate is severely degraded. In the case of a video, for example, the eye is very sensitive to the changes in quality of the images. It is therefore important to have smooth variations.

In addition, compression creates dependencies between the successive data items. Therefore, if one data item is not received, the following data items are corrupted for a certain period of time. In the case of video data, this is known as compression with motion compensation. The video may be coded in accordance with one of the standards described in the ITU-T recommendations H.263, H.264, or else MPEG-4.

These multimedia streams are transmitted over communication networks consisting of interconnection nodes (routers, switches, etc.) so as to convey the data packets coming from source devices to destination devices. They share these networks with other data streams (for example from Internet browsing, a video game, the transfer of a file to a printer, etc.). All these data streams may thus create congestion on the communication networks when they pass through the same network link of insufficient capacity. The surplus packets generally end up being rejected by the interconnection node located at the entry to the link.

Traditionally, servers and clients use communication protocols which implement control mechanisms so as to avoid continually losing a large quantity of data in the event of congestion. They make it possible to detect the occurrence of a congestion phenomenon as a function of packet losses, and they act on the transmission rate of the data stream in order to reduce it or increase it, so as to be compatible with the overall bandwidth of the network.

The congestion control mechanisms generally used in IP networks are of the TFRC ("TCP Friendly Rate Control", IETF RFC3448) or AIMD ("Additive Increase/Multiplicative Decrease", IETF RFC2581) type. These algorithms periodically calculate the quantity of data that can be sent. Packets corresponding to this quantity of data are then taken from the buffer of data that have already been coded, and are sent over the network.

The rate calculated by the congestion control may vary very rapidly and much more rapidly than the changes in the compression rate of the multimedia data. This may lead to a significant increase in the quantity of data in the buffer of data to be sent, and may therefore give rise to significant waiting times. Due to the limited life span of the data packets, this wait may render certain packets unusable by the client, which, due to the dependencies between data, may also have a very substantial impact on the quality perceived by the user.

It is therefore desired to reduce the impact of a rapid change in the available bandwidth on the quality of the data.

The patent document WO-A-2004 064373 discloses a method for coding a video using a reference image buffer containing a plurality of images, these reference images being used in the context of the aforementioned dependency between data. A number of techniques are presented for selecting the best reference to use. In particular, the coder receives the information about bandwidth and packet loss. It can adapt the size of the images to the bandwidth. In the case of a reduction in bandwidth, the coder can select an older reference image since it is of better quality. In the case of packet losses, it can calculate the propagation of the error and avoid using as reference an image that has been affected by the error.

However, the described system has the disadvantage in particular of a lack of reactivity in response to the variations in bandwidth.

The paper by Sang H. Kang and Avideh Zakhor entitled "*Packet scheduling algorithm for wireless video streaming*", Packet Video workshop 2002, describes a packet scheduler for sending videos. The sending rate of the packets is adapted to the constraints of the network bandwidth. The order of the packets to be sent is adapted by the scheduler to the structure of the video and to the expiry times of the images: the images of type I have a higher priority than the images of type P; the images P at the start of a Group Of Pictures (GOP) have a higher priority than the images P at the end of a GOP since they have a greater number of dependent images.

However, this solution is also not satisfactory in terms of the reactivity in the event of a change in bandwidth.

The patent document U.S. Pat. No. 6,141,380 discloses a method for coding a video. The coder may decide to skip the next image, that is, not to code it. This decision is based on the quality of the video, in particular on the motion, and on an estimate of the available bandwidth.

However, this method also does not offer sufficient reactivity to adapt the coding and the transmission of data to the variations in bandwidth.

SUMMARY OF THE INVENTION

The object of the present invention is to overcome the disadvantages of the prior art by determining both how to code the data, which packets to send and in which order to send them, in particular as a function of the change in available bandwidth.

To this end, the present invention proposes a method for transmitting a video consisting of a plurality of images in a communication network, this method comprising:

a step of coding images with motion compensation, which consists in compressing the images of the video and in creating dependencies between compressed images, a step of scheduling the transmission of packets representing the compressed images, which consists in sending the compressed images over the network in a selected order, and a step of controlling the rate of the video, wherein at least one of reconsidering the selected order of sending already compressed but not yet transmitted images and deleting at least one compressed image is performed at the time of coding a new image.

The invention makes it possible to adapt the size, that is, the rate of the video, and its quality to the available bandwidth: by deleting or by delaying the sending of certain images that have already been coded by modifying the sending order, the coder can retain a sufficient size for the next image to be coded; furthermore, the coding of the new image takes account of the images that might not be received.

Deleting an already compressed image and sending a newly coded image instead has to main advantages. First, the client is provided with the most recent image, and second, the transmitted image is the best adapted one to the actual available bandwidth, contrary to the already compressed image.

In addition, the invention makes it possible to recover rapidly from a significant reduction in bandwidth, or even a cutting-off of the network, with a small loss of quality.

Furthermore, in the case of a reduction in the available bandwidth of the network, the invention makes it possible not to destroy packets but merely to delay the sending thereof; thus, in the event of a rapid increase in bandwidth after the reduction, the system can often retrieve and finally send the packets that were initially delayed.

In a preferred embodiment, the dependencies between the new image to be compressed and the compressed images are selected by taking into account the reconsidered sending order at the time of coding the new image.

In this embodiment, the step of controlling the rate controls the steps of image coding and packets transmission scheduling by selecting simultaneously the dependencies between the new image to be compressed and the compressed images and the order of sending already compressed images at the time of coding the new image.

Thus, the order of sending the compressed images is determined at the same time as the choice of the coding mode and the selection of at least one reference image, when an inter coding mode is chosen, for the new image to be coded.

In a particular embodiment, the dependencies between images and the sending order of the compressed images are selected as a function of the available bandwidth of the network, and/or the number of packets waiting to be sent and the content of the video.

Thus, the coding of the transmitted video can vary rapidly as a function of the variations in bandwidth of the network. The bandwidth may be measured directly or deduced implicitly from the number of packets waiting to be sent.

According to a particular feature, the method furthermore comprises a step which consists in evaluating the available bandwidth by means of a mechanism for controlling the congestion on the network.

The congestion control mechanisms make it possible to obtain an indication of the bandwidth actually available on the network in the presence of concurrent traffic, without requiring any hardware support on the part of the network infrastructure.

According to a particular feature, the congestion control mechanism is of the TFRC ("TCP Friendly Rate Control") or AIMD ("Additive Increase/Multiple Decrease") type.

These congestion control mechanisms use only information that is simple to calculate: the packet losses detected by the client and the communication time between the server and the client.

According to a particular feature, the method furthermore comprises a step which consists of determining a quality for the video as a function of its content, this quality taking into account the images that have not been sent.

This makes it possible to optimize the quality of the video actually received and decoded by the client, and not the quality of the coded video.

According to a particular feature, the selection of the dependencies between the new image and the compressed images consists in defining a coding mode for the new image with or without dependency.

The selection of a coding mode (intra code mode generating images without dependency, for example of type I, or inter coding mode generating images with dependency, for example of type P) is easy to carry out and applies to many codecs, even old codecs such as those of the MPEG2 type.

According to a particular feature, when a coding mode with dependency is defined, the selection of the dependencies between images furthermore consists in defining at least one possible reference image.

The selection of the dependencies can thus be much finer, which makes it possible to obtain a better adaptation of the rate of the video to the available network bandwidth.

According to a particular feature, the deleting at least one compressed image that have not been transmitted is performed after a reordering of the compressed images.

The deletion of packets representing the compressed images is very simple to carry out. Moreover, in some cases, packets must not be sent since they would be incompatible with certain choices of changing the coding of the video (for example, in the case of a deletion of an image I).

The selection of the sending order of the packets may also consist in deciding to delay or bring forward the sending of at least one compressed image.

It is thus possible to reserve the possibility of changing opinion if the bandwidth available on the network increases again. It will thus be possible to send images which would not have been sent if the bandwidth had remained low.

According to a particular feature, packets representing each compressed image are assigned a certain priority and a certain expiry time, after which the sending of the packets becomes useless, and the packets are sent in order of decreasing priority and in order of increasing expiry time.

This makes it possible to easily modify the order of sending of the packets.

According to a particular feature, the video is coded in the H.264 format.

This format, which is the most recent and the most effective to date, makes it possible, in particular, to have a plurality of reference images, which facilitates the dynamic selection of the reference images.

For the same purpose as that indicated above, the present invention also proposes a server for transmitting a video consisting of a plurality of images in a communication network, said server comprising:

a module for coding images with motion compensation, compressing the images of the video and creating dependencies between compressed images, a module for scheduling the transmission of packets representing the compressed images, adapted to send the compressed images over the network in a selected order, and a module for controlling the rate of the video, wherein at least one of reconsidering the selected order of sending already compressed but not yet transmitted images and deleting at least one compressed image is performed at the time of coding a new image.

According to a preferred embodiment, the dependencies between the new image to be compressed and the compressed images are selected by taking into account the reconsidered sending order at the time of coding the new image.

Still for the same purpose, the present invention also relates to a telecommunications system comprising a plurality of terminal devices connected via a telecommunications network, noteworthy in that it comprises at least one terminal device equipped with a transmission server as briefly described above.

Still for the same purpose, the present invention also relates to a means for storing information that can be read by a computer or a microprocessor holding instructions for a computer program, noteworthy in that it makes it possible to carry out a transmission method as briefly described above.

Still for the same purpose, the present invention also relates to a computer program product which can be loaded onto a programmable apparatus, noteworthy in that it comprises sequences of instructions for carrying out a transmission method as briefly described above, when this program is loaded and executed by the programmable apparatus.

Since the particular features and the advantages of the transmission device, of the telecommunications system, of the information storage means and of the computer program product are similar to those of the transmission method, they are not repeated here.

BRIEF DESCRIPTION OF THE DRAWINGS

Other aspects and advantages of the invention will become apparent on reading the following detailed description of particular embodiments, given by way of non-limiting examples. The description refers to the accompanying drawings, in which:

FIG. 7 is a flow chart illustrating the main steps of scheduling packets according to the present invention, in a particular embodiment;

FIG. 8 is a flow chart illustrating the main steps of controlling the rate according to the present invention, in a particular embodiment;

DETAILED DESCRIPTION OF PREFERRED EMBODIMENTS

Figure 1:
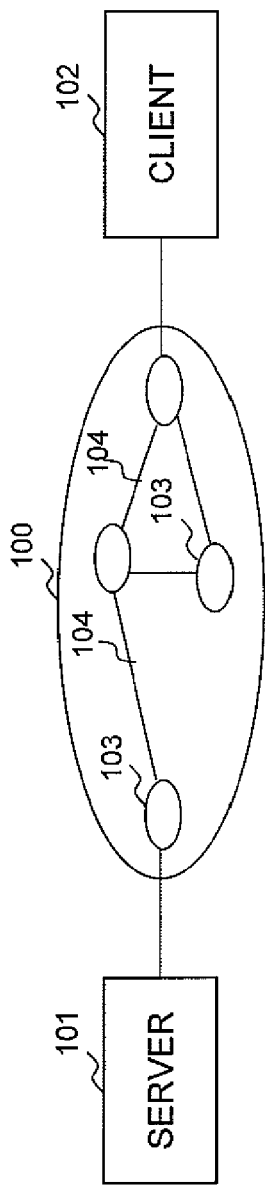
FIG. 1 schematically shows a data communication network of the distributed type, capable of implementing the present invention.

FIG. 1 shows an example of a data communication network in which the present invention can be implemented.

A transmitting device or server 101 transmits data packets of a data stream to a receiving device or client 102 via a data communication network 100.

The network 100 may contain interconnection nodes 103 and links 104 which create pathways between the transmitting and receiving devices.

The interconnection nodes 103 and the receiving device 102 may reject data packets in the event of congestion, that is, if the receiving memory is overflowing.

The network 100 may, for example, be a wireless network of the WiFi/802.11a or b or g type, or an Ethernet or Internet network.

The data stream supplied by the server 101 comprises video information coded with motion compensation.

The transmitting device 101 may be any type of data processing device capable of coding and supplying a data stream to a receiving device. By way of non-limiting example, the transmitting device may be a streaming server capable of supplying content to clients on demand, for example using the RTP protocol ("Real-time Transport Protocol") on UDP ("User Datagram Protocol") or DCCP ("Datagram Congestion Control Protocol") or any other type of communication protocol.

The transmitting device may implement a congestion control algorithm of the type mentioned above, namely, TFRC or AIMD.

The receiving device 102 receives the data, decodes them and displays them with a low latency.

Both the transmitting device 101 and the receiving device 102 may be for example of the type shown in FIG. 2, described below.

Figure 2:
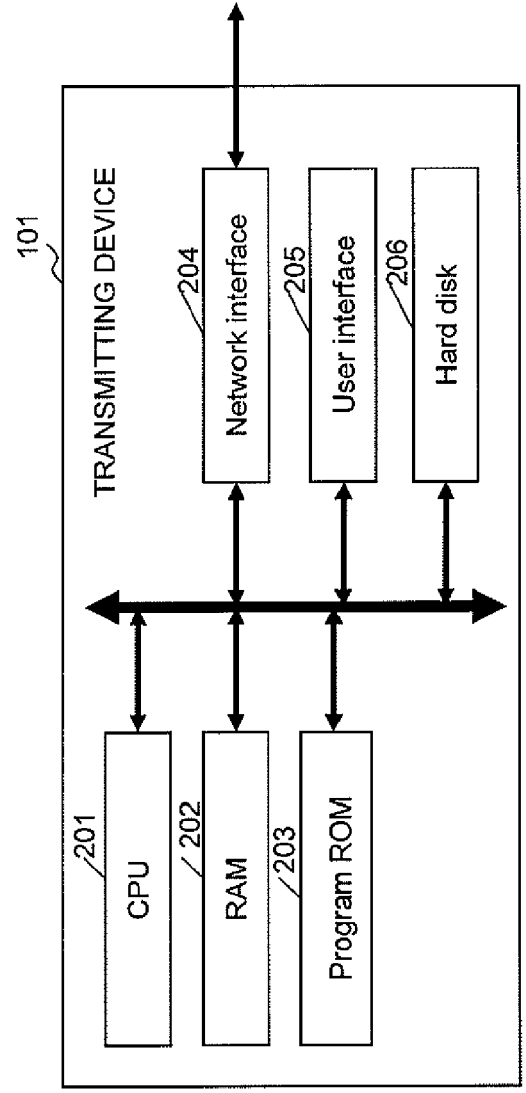
FIG. 2 schematically shows a particular embodiment of a transmitting device adapted for implementing the present invention.

FIG. 2 illustrates in particular a transmitting device 101 adapted for incorporating the invention, in a particular embodiment.

Preferably, the transmitting device 101 comprises a central processing unit (CPU) 201 capable of executing instructions coming from a program read-only memory (ROM) 203 when the transmitting device is powered up, and also instructions relating to a software application coming from a main memory 202 after powering-up.

The main memory 202 is for example of the random access memory (RAM) type and operates as a working zone of the CPU 201. The capacity of the RAM memory 202 may be increased by an optional RAM connected to an extension port (not shown).

The instructions relating to the software application may be loaded into the main memory 202 from a hard disk 206 or else from the program ROM 203 for example. In general, a means for storing information that can be read by a computer or by a microprocessor is adapted to store one or more programs, execution of which makes it possible to carry out the method according to the invention. This storage means may or may not be integrated in the device 101 and is optionally removable. The execution of the program(s) mentioned above may take place for example when the information stored in the storage means is read by the computer or by the microprocessor.

The software application, when it is executed by the CPU 201, causes the execution of the steps of the flow charts in FIGS. 7 to 9.

The transmitting device 101 furthermore comprises a network interface 204 which allows it to be connected to the communication network 100. The software application, when it is executed by the CPU 201, is able to react to requests from the client 102 received via the network interface 204 and to supply data streams to the client 102 via the network 100.

The transmitting device 101 additionally comprises a user interface 205, consisting for example of a screen and/or a keyboard and/or a pointing device such as a mouse or an optical pen, for displaying information to a user and/or receiving inputs from the latter. This interface is optional.

An apparatus which implements the invention is for example a microcomputer, a workstation, a digital assistant, a mobile telephone, a digital camcorder, a digital camera, a video surveillance camera (for example of the webcam type), a DVD reader, a multimedia server or a router element in a network. This apparatus may incorporate directly a digital image recorder or, as an option, may be connected to various peripheral devices such as, for example, a digital camera (or a scanner or any means for acquiring or storing images) connected to a graphics card and supplying multimedia data to the apparatus.

The apparatus may also have access to multimedia data on a storage medium (for example the hard disk 206) or else may receive a multimedia stream to be processed, for example from a network.

Figure 3:
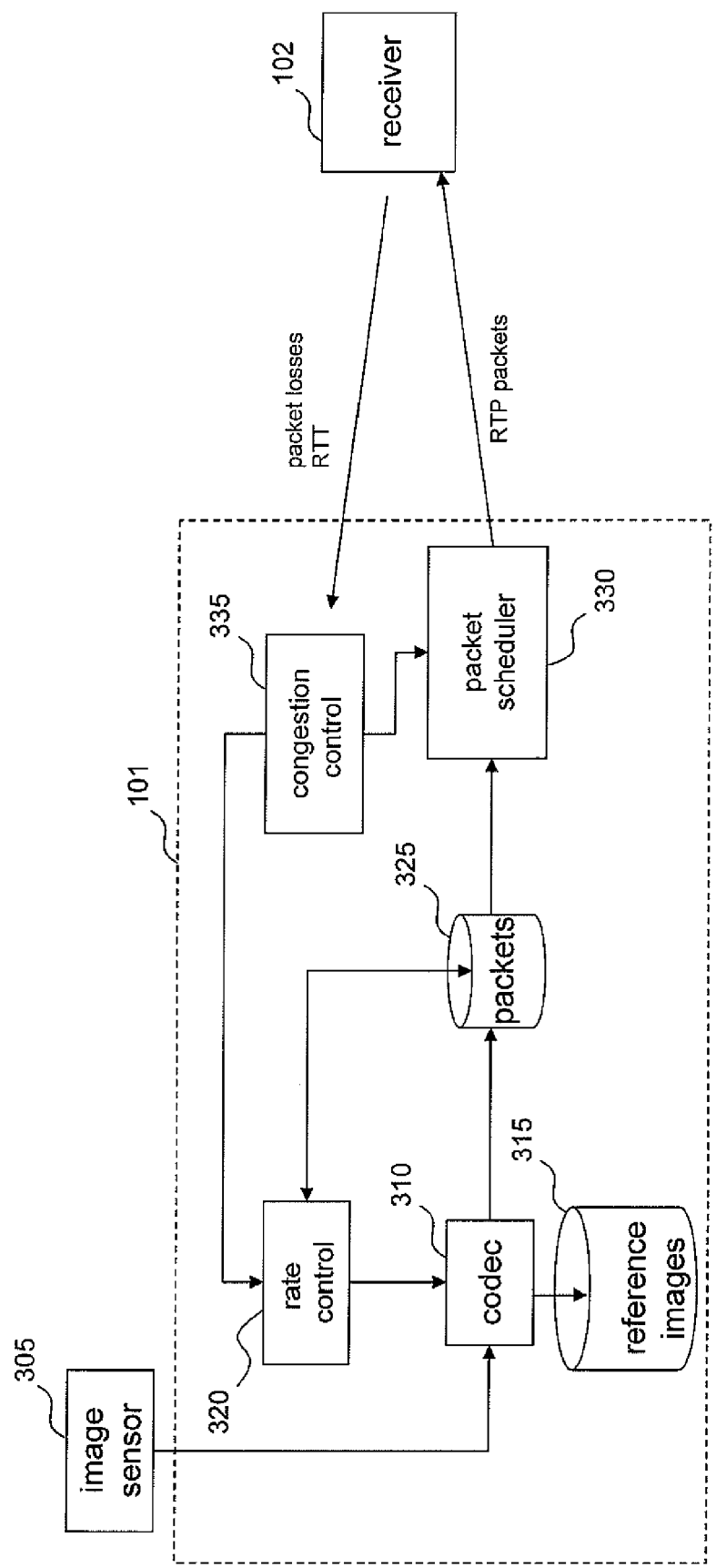
FIG. 3 schematically shows the architecture of a server capable of implementing the present invention, in a particular embodiment.

FIG. 3 illustrates in greater detail the architecture of a server 101 according to the present invention, in a particular embodiment.

The server has as input a video coming for example from a sensor 305. The sensor 305 is for example a camera.

The video is supplied to a video coder or codec 310 which codes the video in a known format, for example H.264, then stores the result in a buffer memory 325 in the form of packets which are ready to be sent. Throughout the rest of the text, this buffer memory will be referred to as the packet buffer 325.

As a variant, the server may receive from another network a video that has already been coded, for example in the case of a home gateway receiving a television channel via the Internet. In this case, the codec 310 transcodes the video in order to adapt its rate to the bandwidth of the home network, which is for example a wireless network. As in the first case, the data created is stored in the packet buffer 325.

The codec 310 stores a plurality of reference images in a buffer memory 315. Throughout the rest of the text, this buffer memory will be referred to as the reference image buffer 315. These images have been coded then decoded and will be used to compress the subsequent images.

The codec 310 is controlled by a video rate control module 320. The module 320 determines the quantity of data that the coder can produce and the quality of the coded video. To do this, conventionally, the rate control module 320 calculates the quantization step of the next image as a function of the content of the packet buffer 325 and the network bandwidth information coming from a congestion control module 335. The rate control module 320 also selects a sub-portion of the reference images that the coder can use.

The packets stored in the packet buffer 325 are read and sent over the network by a packet scheduling module 330 which is responsible for sending the packets. The packet sending algorithm is described in more detail below in connection with FIG. 7. The packet scheduling module 330 decides which packets to send each time it is called upon by the congestion control module 335.

The congestion control module 335 calculates the bandwidth available on the network and decides when packets can be sent. To carry out these calculations, the module 335 uses information received from the client via the network, in particular packet loss events, the Round-Trip Time (RTT) on the network and the display latency.

The display latency is the limit life span of a data item. Beyond the latency, the data can no longer be used since the image has already been decoded in order to be displayed. This information is conventionally transmitted using the RTCP messages of the RTP protocol. The display latency may also be received during an initial phase of initiating the communication (for example during Real Time Streaming Protocol (RTSP) exchanges, IETF RFC 2326).

Figure 4:
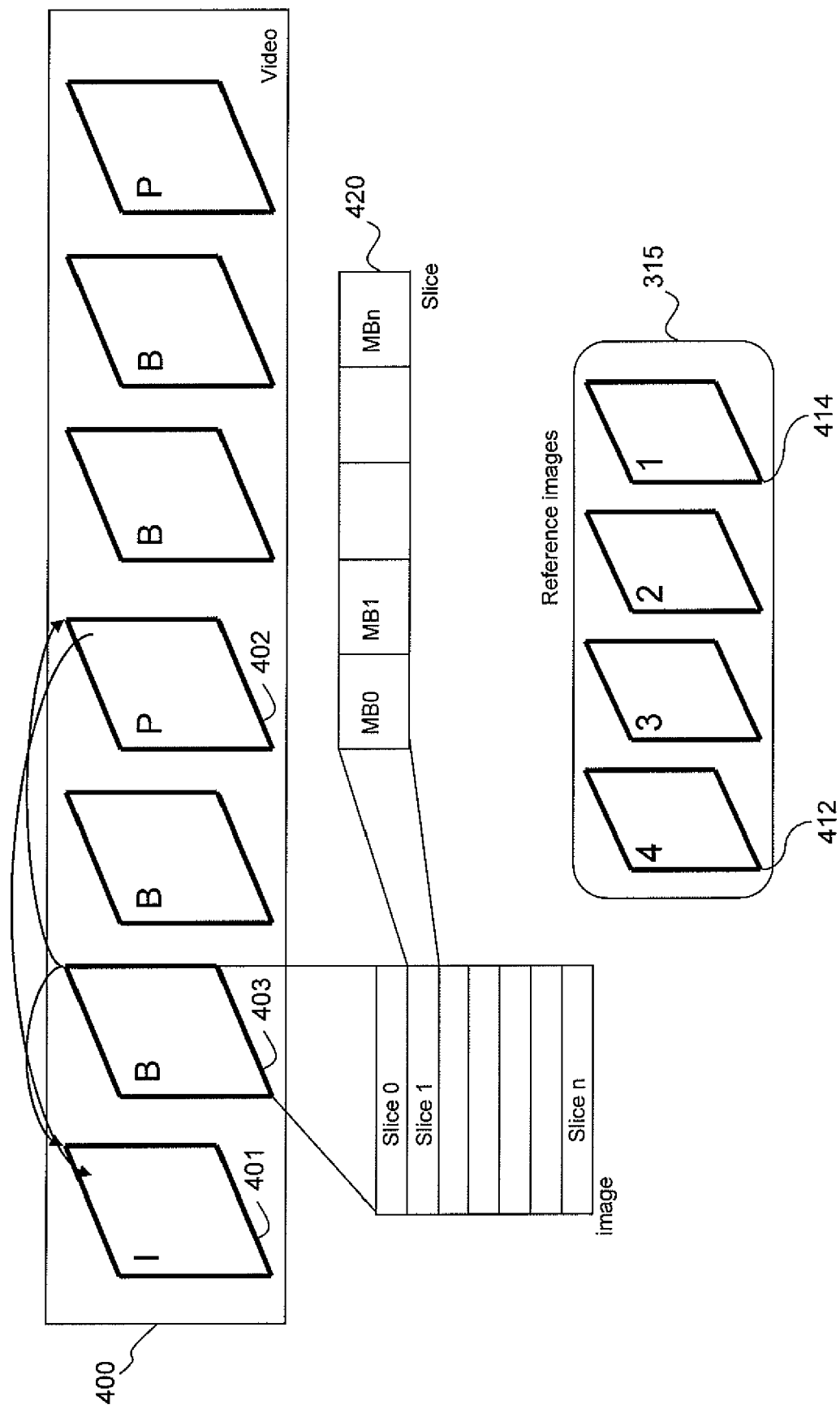
FIG. 4 illustrates the structure of a video that has been compressed for the transmission thereof according to the present invention, in a particular embodiment.

FIG. 4 shows the structures defined for the coding based on motion compensation. A video 400 compressed by a coder based on motion compensation (for example according to the standard H.264, MPEG-4 Part 2, etc.) is composed of a set of images 401, 402, 403, etc. coded in a plurality of modes: without motion compensation, this is known as intra or I coding (image 401). The inter mode (e.g. image 402) is based on motion compensation on the basis of a reference image. The image coded with this mode is known as predicted image or P image. The bidirectional or B mode (e.g. image 403) is based on motion compensation on the basis of two reference images.

A Group Of Pictures (GOP) is a sequence of images starting with an image I which makes no reference to an image in a previous GOP.

The images are compressed in macroblocks (blocks of 16×16 pixels). The macroblocks are grouped into slices 420. In the case of sending a video over a network, each slice is placed in an RTP packet and sent over the network to the receiver.

In one image there may be different types of macroblocks: in an image I, all the macroblocks are of type I, but in an image P the macroblocks are of type I or P, and in an image B they are of type I, P or B. Each macroblock may also use a different reference image in the reference image buffer 315.

The reference image buffer 315 consists of a set of images 414, 412, etc. of the video sequence which have previously been coded then decoded. It makes it possible to store the images used as references during the motion compensation.

During the coding, each macroblock coded in the inter mode first passes through a compression step which starts with a motion calculation. In the inter mode, a macroblock can be partitioned to a size 4×4 in the H.264 format. In the motion calculation step, each partition is compared with zones in reference images contained in the reference image buffer 315. The zone selected is the one which most resembles the pixels to be coded. There are numerous algorithms which make it possible to obtain a good result quickly without carrying out an exhaustive search in all the reference images.

The reference image buffer is used both in the coder and in the decoder. For the coder it is used during motion estimation, and for the decoder it is used for motion compensation. Consequently, this buffer must be updated in the same way on both the client and server side. This buffer is generally filled by following the principle of a FIFO queue. The new reference images (such as the image 412 in FIG. 4) are added at the end of the queue of the reference image buffer. When the queue is full, the image at the front of the queue is deleted (image 414 in the example of FIG. 4).

However, there are more complex cases in which commands for manipulating the buffer may be associated with images.

In the case of the H.264 format, the reference image buffer 315 has the possibility of distinguishing between two types of memories: the short-term memory and the long-term memory. The short-term memory operates on the principle of the FIFO queue, described above. The long-term memory makes it possible to retain an image for a longer duration. Commands present in the headers of the slices make it possible to label an image as a long-term reference. To remove the images from the long-term reference image buffer, it is necessary to use an explicit command ("mmco"), which is also specified in the header of the slices.

Still in the case of the H.264 format, an image I of type IDR ("Instantaneous Decoding Refresh": for example, the first image of a GOP) empties the reference image buffer. The IDR type is specified in the form of a flag in the header of the image slices.

According to the present invention, the search for motion vectors is limited to a sub-portion of the reference images selected by the rate control module 320 as a function of criteria associated with the network. This functionality is described in detail below.

The difference between the exact value of the image and the image portion selected by the motion calculation is calculated. This value is known as the residue.

The residue (or the value of the image in the case of an intra macroblock) is then transformed block by block and subsequently quantized.

The quantization makes it possible to check the quantity of data produced (this is a compression with losses). The quantization parameter is selected by the rate control module 320.

The result of the quantization passes through an entropic coding (such as a Variable Length Coding) slice by slice. The coded macroblocks are thus obtained, which are then grouped into slices and sent in RTP packets.

Depending on the size of the video, on the type of image coded (I, P or B), on the quantization step and on the content of the images, the size and therefore the number of packets produced per image is highly variable: from a few packets to several hundred.

In the case of a video with 25 images per second, a new image is coded every 40 ms.

A congestion control algorithm calculates the quantity of data sent at each instant on the network. This is because if all the packets which make up an image were sent within a very short period of time, this would create congestion on the network. It is therefore necessary to smooth the sending of the packets in order to avoid sending too many packets simultaneously. It is also necessary to adapt to the state of congestion of the network by varying the number of packets that are being sent.

The most well-known congestion control is that of TCP which is of the AIMD type. This algorithm works by gradually increasing the rate of data sent as long as the client indicates that the packets are being correctly received.

Figure 5:
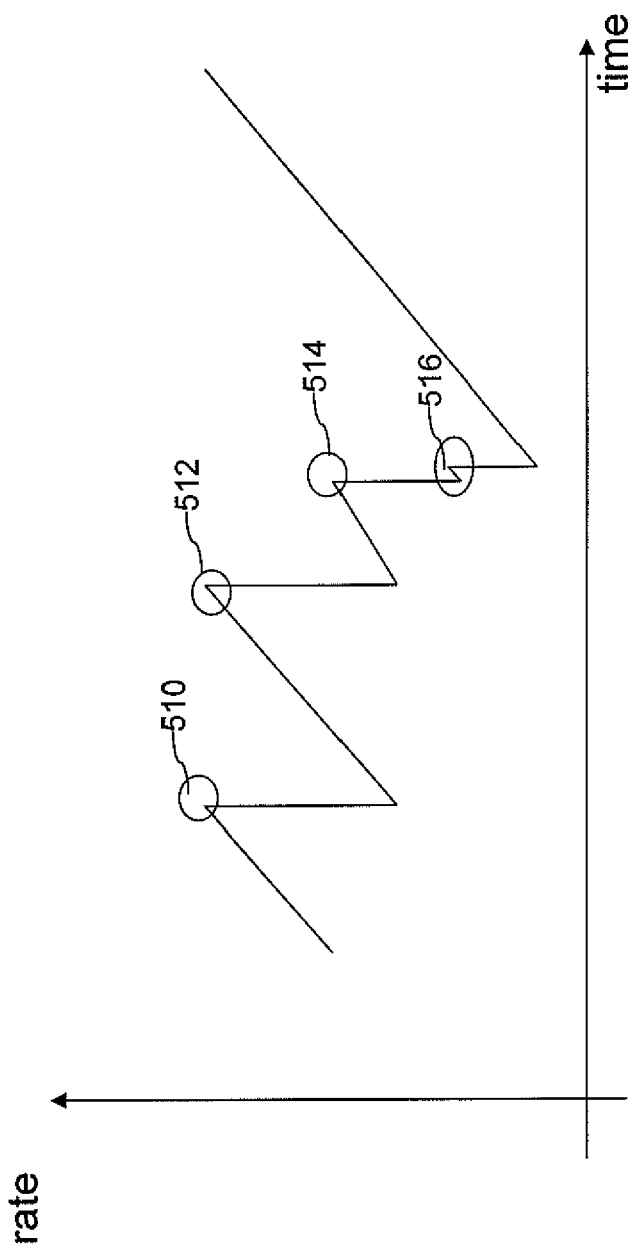
FIG. 5 is a graph illustrating a non-limiting example of congestion control implemented in the context of the present invention.

On average, TCP sends one more packet for each correct round-trip, which gives a linear increase. When an error appears, this means that the network is congested; as a reaction, the rate is divided by 2. This mode of operation is illustrated by the curve in FIG. 5, showing the rate as a function of time. When there are no losses, the rate increases linearly. The loss events (marked at 510, 512, 514, 516 on the drawing) cause a drop in the available bandwidth. Several loss events may sometimes occur very close together, resulting in very substantial rapid drops.

Because of the transmission time of the packet and the time taken to receive the information as to whether the packet has been correctly received, AIMD has a behaviour that is closely linked to the Round-Trip Time (RTT) of the network. In a local or short-distance network, the RTT time may be very short, typically around one millisecond. There may therefore be very rapid variations in network bandwidth compared to the speed of the coder (for example, one image every 40 ms).

There may also sometimes be a complete interruption in communication, for example if, because of considerable congestion, all the receipt acknowledgement packets have been lost. In this case, the interruption may last for several hundred milliseconds.

Like the congestion control algorithm AIMD, an algorithm of the type TFRC also works by using the packet loss events and an RTT calculation. It calculates the rate by following an equation which has to give a rate comparable to that of TCP, but with more smoothed variations. However, it has been found that, even if the variations are less abrupt, there may be very considerable variations over very short periods of time in the case of a network with a short RTT. As in the congestion control algorithm AIMD, there may be interruptions of several hundred milliseconds.

In both cases, the congestion control module 335 receives control information from the client, allowing it to calculate the loss rate or the loss events and also the RTT time.

By using this information, the congestion control module 335 calculates an available network bandwidth. It can thus activate the packet scheduler 330 repeatedly by spacing apart each activation over time. Upon each activation, it indicates to said packet scheduler a number of packets to be sent so as to comply with the current bandwidth.

The bandwidth information is also sent to the rate calculation of the coder so that the latter can use it to adapt the size of the next images.

Figure 6:
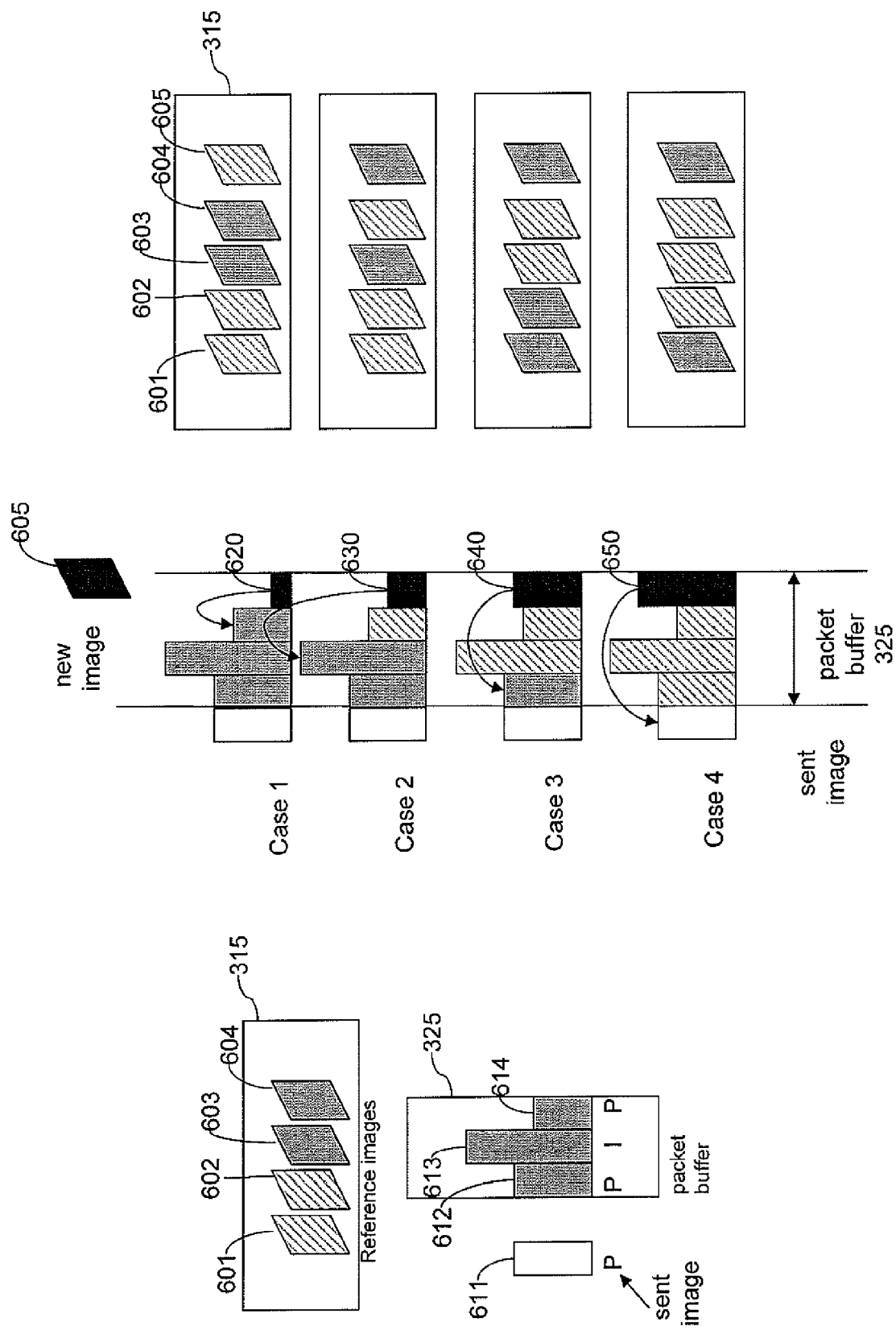
FIG. 6 illustrates the principle of rate control implemented in the context of the present invention, in a non-limiting example.

The principle of rate control according to the invention will now be explained on the basis of a non-limiting example shown in FIG. 6.

Consider the case in which the network bandwidth has been stable on average for a period of several images and in which the available network bandwidth suddenly decreases. The previous images (601, 602, 603, 604 in the drawing) have been coded, resulting in compressed images 611, 612, 613, 614 of different types (I for 613, P for the others) and having variable sizes.

The first image 611 has already been sent to the client and has therefore been deleted from the packet buffer 325. The three other images are still in the packet buffer 325 at the time when the coder has to code the new image. Since the four coded images are of type I or P, in the case of a reference image buffer 315 organized as a FIFO queue with 4 places, they can also be stored in the reference image buffer of the coder.

However, in the case where the image 613 is an image I of type IDR, this has the consequence of invalidating the previous images 601, 602 in the reference image buffer. This is shown by the hatching on the images 601 and 602 in the drawing.

At the instant in question, the server has to code a new image 605.

In the prior art (case 1), the rate control will calculate a quantization step for the new image, then the coder will select for each macroblock one of the reference images for the motion calculation (for example the most recent image 604). Since there is a considerable drop in bandwidth, the new coded image 620 will be considerably reduced in size and therefore severely degraded in terms of quality.

It can easily be seen that, in order to send all the previous images and therefore empty the buffer, the packet scheduler will spend more time than initially estimated by the rate control. The situation may therefore occur again where the data of the new image 620 cannot be sent. This poses a serious problem since any future image using it as reference would not be able to be decoded by the client.

An improved version of the rate control (not shown in FIG. 6) could take into account the state of the packet buffer 325 in order to calculate a state of the reference image in the reference image buffer 315. If it finds that the new image 605 cannot be sent, it can then label it as invalid in the reference image buffer, so as to avoid using it as a reference for the next images.

This example shows the case where the state of a reference image in the reference image buffer 315 is modified.

There are a number of other possibilities if the rate control module 320 is authorised to control the buffer of the images that have previously been coded but have not yet been sent (packet buffer 325).

In case 2, the rate control can decide not to send an old image (for example the image 614) of the packet buffer 325. The image 614 can easily be deleted without any impact on the other images of the coded video since it is an image P on which no other image is dependent. If this image 614 is not sent, the coder can allow itself to code the new image 630 with a larger size and therefore a better quality than in case 1 (image 620). The coder must avoid taking the image 604 as reference, since its coded version 614 will not be sent. In FIG. 6, the coder selects for example for one macroblock a reference on the image 603.

In order not to send the image 604, it is possible to simply delete all the packets of the coded image 614 in the packet buffer 325. However, it is better to change its priority and not to delete it immediately. This is because if the bandwidth of the network increases subsequently, it may be possible to send it in time, even if it is sent after the image 630.

This example shows the simultaneous modification of the state of an image in the reference image buffer 315 and the packet buffer 325.

Another possible solution (not shown) would be to delete the image 612. In this case, the new coded image could use either the image 603 or the image 604 as reference.

In order to choose between case 1 and case 2 or this latter solution, it is necessary to take into account not only the quality of each image but also the impact on the quality of the video. For example, in the case where there is a change in scene between the image 602 and the image 603 (which would also justify the I coding of the start-of-scene image 613), but not between the image 604 and the image 605, it is better to choose the latter case (deletion of the image 602). This is because the deletion of an image before the change of scene is less noticeable than a deletion of an image within a scene.

There may also be the case 3 in which the image 613 (of type I) is of such a large size that, with the new bandwidth, it risks delaying all the subsequent images too much. The following solution may therefore be preferred in this case: the image 613 of type I is deleted as well as the image 614 since the latter uses the image 603 as a reference and therefore cannot be decoded if the coded image 613 is not received.

If the image 613 is not sent, the images 601 and 602 are not invalidated in the reference image buffer 315. It is therefore necessary to change their state from invalid to valid.

The coder thus has more bandwidth for the new image 640 and selects a reference image from those which are or have to be sent (611 and 612).

The impact on the quality of the video must be estimated in order to ascertain whether this solution is indeed the best possible solution. The deletion of a plurality of images may significantly degrade the quality of a video in the case of a video with rapid movements. On the other hand, in the case of slow movements, a video can more easily withstand the deletion of a plurality of images.

This example shows that the state of a reference image in the reference image buffer 315 may pass from invalid to valid as a function of the changes in state of the images in the packet buffer 325.

A last case is shown at 650, in which it is preferred to delete all the images of the packet buffer (612, 613 and 614) in order to code the new image, either with reference to the image 601 or in mode I. Since all the previous images have been deleted, there is a larger bandwidth for the new image. This method may be used for example in the case where the new image is a start of a scene and it is therefore preferred to delete the images at the end of the previous scene so as to have a better quality in the new scene.

The flow chart of FIG. 7 illustrates the packet scheduling algorithm used by the packet scheduling module 330.

The packet scheduler 330 is called upon by the congestion control module 335 at certain instants with the command to send N packets (step 700).

During a first step 705, a current priority variable is set to high priority.

Then, during a test 710, it is determined whether the number of packets to be sent has been reached. If this is the case, the algorithm is stopped (step 715).

Otherwise (step 720), all the packets of the packet buffer 325 which have the current priority are selected.

The packet having the shortest expiry time is then selected (step 725). The expiry time of a packet is calculated as a function of the date of creation of the image associated with the packet, the time taken to communicate with the client and the latency of the client, that is to say the delay that the client can accept. This time is determined in a negotiation phase prior to establishing a video stream, or received regularly with RTCP packets. It is important to take account of this maximum time so as not to send packets which are too late and are thus no longer useful to the client. This is what takes place during the test 740, which consists in determining whether the expiry time can be met, then in step 745 in which the packets which are too old are destroyed without being sent, before returning to step 725 for selecting packets on the basis of expiry time.

If, in step 725, no further packets exist with the current priority, the current priority may be lowered (step 730). If the priority was already at the lowest acceptable level, the algorithm can be stopped (step 735). Otherwise, there is a return to step 720 of selecting packets on the basis of priority.

It should be noted that the algorithm described here makes it possible to manage a plurality of priority levels, since it might be chosen to send certain packets which are more important before others, depending for example on a criterion of importance for the visual effect. However, it is important that the packets of lowest priority are not sent, since these might conflict with other packets that have already been sent, because of the dependencies between images. Only the rate control can decide to increase the priority of a packet in order to send it, taking account of the constraints of dependency between images.

In the case where it is determined during the test 740 that the expiry time of the packet can be met, the packet is sent (step 750).

A test is then carried out in order to ascertain whether all the packets of the image have been sent (test 755). If this is the case, the rate control module 320 is notified in step 760, so that the latter takes account of this in its step of selecting the priorities of the images.

There is then a return to the test 710 in order to check whether the correct number of packets has been sent.

The flow chart of FIG. 8 illustrates the rate control algorithm, which makes it possible both to select the coding characteristics for the next image (quantization, reference image) and the priorities of the packets in the buffer of packets to be sent.

During a first step 805, an attempt is made to predict the average bandwidth for the following instants. Ideally, it would be desirable to know the bandwidth that will be available up to the time or date of coding the next image. As described above, the rate of variation of the bandwidth may be very rapid compared with the rate of the images. The bandwidth value calculated by the congestion control is more of an instantaneous value which it is therefore preferable to average so as to obtain an average bandwidth starting from the last image. This value is used as a predictive value for the coming instants.

Then, during a step 810, the time required to empty the packet buffer 325 is evaluated, taking account of the current size thereof.

Taking account of the display latency of the client, it is possible to calculate the maximum date on which a packet has to be sent, and thus to check whether all the images of the packet buffer meet their expiry date (test 812). If this is not the case, a choice is made to delete certain images by making a different choice of coding (step 825).

If it is determined during the test 812 that the time required to empty the packet buffer 325 is acceptable, an attempt is then made (step 815) to calculate the size of the image and the correct compression parameters so as to meet the rate targets and not to cause the output buffer to overflow while maximizing the quality of the video.

One conventional technique consists in using a rate/distortion model. By way of non-limiting examples, known models used in the context of MPEG compression are TMN-5 or TMN-8. These models are based on a quadratic law:

$$B_{frame} = a/q + b/q^2$$

where:
$B_{frame}$ is the rate target for the current image,
q is the average quantization step used in the image,
a and b are parameters of the model estimated by linear regression, based on the previous images of the same type (I, P or B).

It is then necessary to check whether the quality of the video thus obtained is acceptable (test 820). For this, a criterion of continuity of the quality of the images may be considered.

If the quality of the next image is considerably degraded compared to the previous images, then in step 825 other coding choices are evaluated. This step is described in detail below in connection with FIG. 9a. The result of this step is a choice of reference images which can be used by the coder, the priorities for sending the packets and the quantization step of the next image. It may also be desired to re-evaluate the coding scenarios if there is a considerable increase in quality of the image. This is because it may then be possible perhaps to send images which were of low priority.

As a function of these values relating to the coding, it is possible in the next step 830 to update the reference image buffer 315 of the coder and the priorities in the packet buffer 325.

It is then possible to proceed to the coding of the next image (step 835).

Figure 9C:
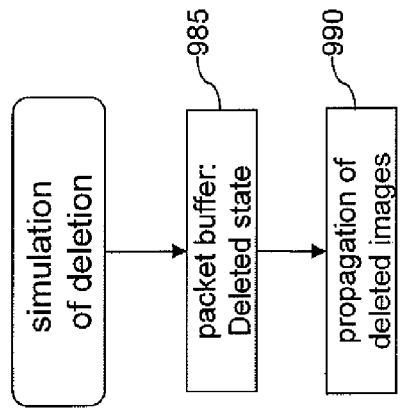
FIGS. 9a, 9b and 9c are flow charts illustrating the main steps of selecting the coding mode according to the present invention, in a particular embodiment.
Figure 9B:
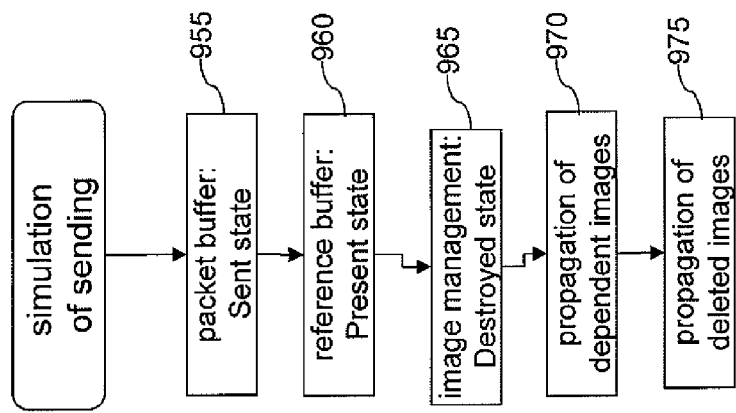
Figure 9A:
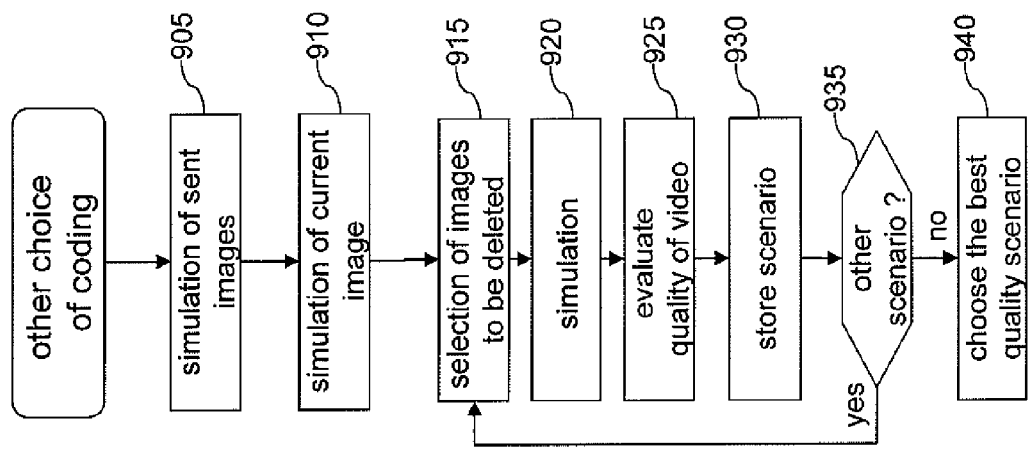

The flow charts of FIGS. 9a, 9b and 9c illustrate the main steps of simultaneously selecting reference images and images to be sent.

This algorithm simulates the mode of operation of the reference image buffer 315 and of the packet buffer 325 so as to discover which images can be sent and which images can be used as references, the objective being to have a video of the best possible quality.

The algorithm uses the dependencies (use as reference image) between the images that have already been coded. There is therefore a graph of dependency between the previously coded images. It is said that an image A is dependent on another image B if at least one macroblock of A uses as reference a zone of B.

Firstly, it is useful to simulate the mode of operation of the reference image buffer of the client so as to know exactly its content, in order to discover the images that are able to be sent. This is because the sending or not of an image may have a number of consequences on the reference image buffer of the client and therefore on the choice of other images that can be sent:

the addition of an image to the reference image buffer adds an image that can be used as reference. The dependent images can thus be sent. Conversely, therefore, if a reference image is not sent, the dependent images cannot be sent.

the decoding and the addition of an image may destroy images in the reference image buffer of the client:
  on the one hand, because of the FIFO mode of operation of the reference image buffer with a limited memory. The addition of an image therefore deletes the oldest image;
  on the other hand, because of the commands to manipulate the images of the long-term type in the reference image buffer;
  finally, because of the images of the IDR type, which empty the reference image buffer.

The reference images thus deleted can no longer be used by other images which might be subsequently decoded.

The simulation uses two simulated buffers with a plurality of states for each image:
  the state of the images in the simulation of the reference image buffer may be:
    Present: the image is present in the reference image buffer of the client and can be used;

Invalid: the image is present in the reference image buffer, but is not correct (it has not been transmitted in full or it is dependent on images which are not present);

Destroyed: the image has been deleted from the reference image buffer of the client;

Absent: the image has not been placed in the reference image buffer of the client.

the state of the images in the packet buffer may be:

Sent: the image has been sent;

Deleted: the image has not been sent;

Unknown: the state of the image has not yet been selected.

Figure 10:
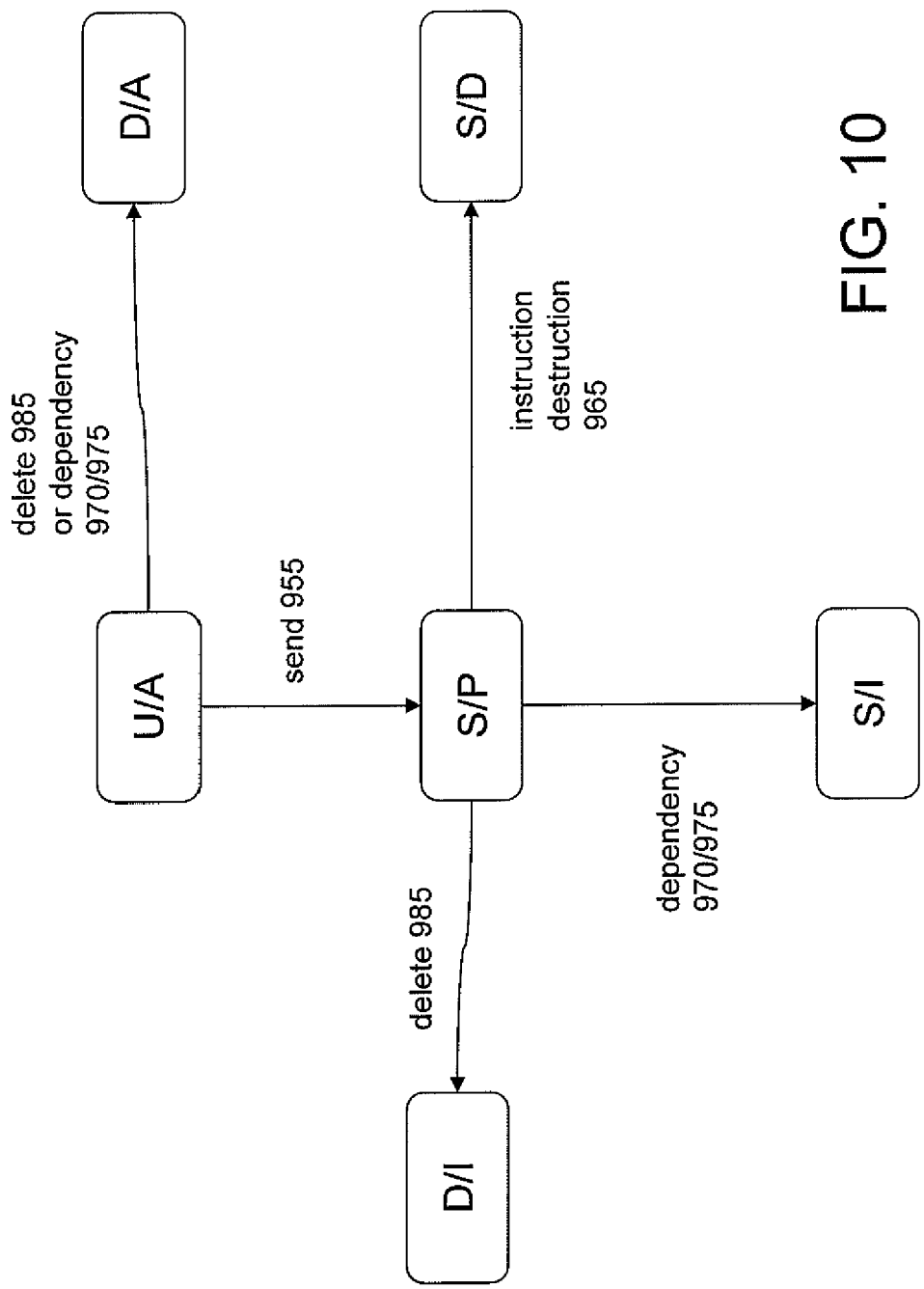
FIG. 10 schematically summarizes the different states and transitions between possible states for images contained in a reference image buffer memory and in a packet buffer memory, when simulating the operation of these memories according to the present invention, in a particular embodiment.

The states of the simulation of the two buffers evolve in a manner associated with one another: the states that an image may have in the simulation are: Unknown/Absent (U/A), Sent/Present (S/P), Sent/Invalid (S/I), Sent/Destroyed (S/D), Deleted/Absent (D/A), Deleted/invalid (D/I). These states, and also the transitions between states, are shown in FIG. 10. This figure refers to various steps shown in the flow charts of FIGS. 9b and 9c described below.

Initially, all the coded images are added starting from the last IDR image. These images have the states Unknown and Absent.

As shown in FIG. 9a, in step 905, firstly the state of the reference image buffer of the client is calculated on the basis of the images definitely sent. For this, use is made of the information supplied by the scheduler in step 760 of FIG. 7.

From an initial known state (for example, the last IDR image sent, which has thus emptied the reference image buffer of the client), firstly there is simulated the mode of operation of the reference image buffer of the client for each image received and the constraints which result therefrom.

The images are considered, not in the order of sending, but rather in the order of decoding of the video sequence. For each sent image (see FIG. 9b):

the state of the image in the packet buffer is changed to Sent (step 955);

the mode of operation of the reference image buffer of the client is simulated: the image received is added and changed to the Present state (step 960), and the state of the images already present, which have been deleted because of an instruction from the received image, is changed to the Destroyed state (step 965);

the images which are dependent on a destroyed image and which come after the sent image are changed to the Deleted and Absent state (step 970). If a dependent image was already in the Sent/Present state, it is changed to the Sent/Invalid state. If it was in the Sent/Destroyed state, it does not change state;

recursively, the Deleted/Absent state continues to be propagated for all the images dependent on an image in the Deleted or Invalid state (step 975). As in step 970, if a dependent image was already in the Sent/Present state, it is changed to the Sent/Invalid state. If it was in the Sent/Destroyed state, it does not change state.

At the end of step 905 in FIG. 9a, the current state of the reference image buffer of the client is thus obtained on the basis of the sent images.

It is then useful (step 910) to take into account the state created by the image which is currently being sent. This is because, when the rate control module 320 executes its algorithm, an image may have started to be sent. It may be decided to stop this sending, but the client will still receive the packets already sent and therefore will execute the associated commands for managing the reference image buffer.

For the image currently being sent, the steps of FIG. 9b are carried out separately from step 955: the image remains in the Unknown state.

The initial state of the simulation is thus obtained.

One or more scenarios of images deleted from the packet buffer 325 are then simulated.

In step 915, one or more images to be deleted are selected. Only the images having the Unknown state can be selected. Use may be made of a heuristic method, for example selecting the images having the largest sizes (this choice being particularly beneficial if there is a considerable drop in bandwidth or a long interruption, typically of around several hundred milliseconds), or selecting only images which have no or few dependent images.

The next simulation step 920 consists in simulating the consequences of the choices. For each image that has been selected as not to be sent (see FIG. 9c):

the state of the image in the packet buffer is changed to Deleted (step 985). If the state is Present, this state is changed to Invalid since this is the image currently being transmitted: even if the sending thereof were to be stopped, it will nevertheless be present in the reference image buffer of the client, but in an incomplete form;

all the dependent images are recursively changed to the Deleted/Absent state. If a dependent image was already in the Sent/Present state, it is changed to the Sent/Invalid state (step 990).

The sending of the remaining images is then simulated. All the images are again taken in the order of decoding of the video sequence. For each image:

if the state is Unknown, if its size is smaller than the available size, its size is added to the quantity of data sent and then its sending is simulated according to FIG. 9b;

if the size of the image is too large compared to the available bandwidth, the image is not sent and its deletion is simulated according to FIG. 9c.

if the state of the image is Sent, its impact is recalculated by following the algorithm of FIG. 9b. This is because, during the first simulation (step 905), not all the sent images were yet known and therefore the number of images destroyed in step 965 may have been underestimated;

if the image is already in the Deleted state, it is ignored.

A complete scenario has thus been calculated: all the images are in the Sent or Deleted state.

It is then possible (step 925) to evaluate the quality of the resulting video by taking account of the quality of the images, the number and placement of the deleted images relative to the content of the video, the quantity of motion in the video and the changes in quality in the successive images.

A value may for example be calculated as follows:

an average quality for the sequence is calculated: the average of the qualities of the images in the Present and Valid state. This gives a first evaluation of the quality;

all the images are then reviewed starting from the oldest in the packet buffer:

it may be estimated for each image in the Deleted/Absent state whether it has a high or low visual impact depending on the movements and changes of sequence: an image in a sequence with considerable movement has a high impact, an image at the start or end of a sequence or in a sequence with little movement has a low impact;

an image in the Sent/Invalid state has a high impact on the quality of the sequence: this is because the decoder risks having great difficulty in correcting the visual effect;

finally, a sudden change in the level of compression for an image in the Sent/Present state has a medium visual impact.

The impact calculated for each image makes it possible to modify the quality calculated for the sequence and to obtain a quality for the scenario.

The scenario thus created is stored (step 930). It is then possible to explore other hypotheses (test 935) by repeating step 915 with other choices, which makes it possible to test a number of heuristic methods or, if there is enough time, to simulate all the possible scenarios.

After having explored all the hypotheses, the best quality scenario can be selected (step 940). The scenario contains the state of the reference image buffer and of the packet buffer: the images in the Present state can be used in the reference image buffer of the coder; the others are in the Invalid or Absent state and must not be used as reference. The images in the Sent state which are still in the packet buffer have a high priority; the others have a low priority since they do not have to be sent.

What is claimed is:

1. A method for transmitting a video stream including a plurality of compressed images in a communication network, said method comprising:
    a step of coding a plurality of original images with motion estimation and motion compensation, including compressing the plurality of original images of the video and creating dependencies between compressed images of the plurality of compressed images, said step of coding a plurality of original images being performed based on a current rate of the video;
    a step of storing packets representing the compressed images into a buffer;
    a step of scheduling a transmission of packets representing the compressed images of the video stream, including ordering the compressed images together according to a selected order for their transmission over the communication network;
    a step of controlling the rate of the video;
    a step of modifying a state of the compressed images in the buffer based on a new rate of the video;
    at least one step of reconsidering the selected order of transmission already compressed but not yet transmitted images in the buffer and deleting at least one compressed image in the buffer based on said step of modifying and at a time of coding a new image that is not in the buffer;
    a step of coding the new image based on the new rate of the video; and
    wherein dependencies between the new image to be compressed and the compressed images are selected by taking into account the selected order reconsidered at the time of coding the new image.

2. The method according to claim 1, wherein dependencies between images and the selected order for transmission of sending the compressed images are selected as a function of an available bandwidth of the communication network, and/or a number of packets waiting to be sent and content of the video.

3. The method according to claim 2, wherein the method further comprises a step of evaluating said available bandwidth via a mechanism for controlling congestion on the communication network.

4. The method according to claim 3, wherein the mechanism for controlling the congestion is of a TFRC ("TCP Friendly Rate Control") or AIMD ("Additive Increase/Multiple Decrease") type.

5. The method according to claim 2, wherein a selection of the dependencies between the new image and the compressed images includes defining a coding mode for the new image with or without dependency.

6. The method according to claim 5, wherein, when a coding mode with dependency is defined, said selection of the dependencies between images further includes defining at least one possible reference image.

7. The method according to any one of claims 1 and 2-6, wherein deleting at least one compressed image in the buffer that has not been transmitted is performed after a reordering of the compressed images.

8. A method according to claim 1, wherein a selection of the order of transmission of the packets includes deciding to delay or bring forward a sending of at least one compressed image.

9. The method according to claim 1, wherein the packets representing each of the compressed images are assigned a certain priority and a certain expiry time, after which sending of the packets representing the compressed images becomes useless, and the packets are sent in a decreasing priority order and in an increasing expiry time order.

10. The method according to claim 1, wherein the video is coded in H.264 format.

11. A server for transmitting a video stream including a plurality of compressed images in a communication network, said server comprising:
    a processor coupled to a memory configured to perform:
    coding a plurality of original images with motion estimation and motion compensation, which includes compressing the plurality of original images of the video and creating dependencies between compressed images of the plurality of compressed images, said coding step being performed based on a current rate of the video;
    storing packets representing the compressed images into a buffer;
    scheduling a transmission of packets representing the compressed images of the video stream, which includes ordering the compressed images together according to a selected order for their transmission over the communication network;
    controlling the rate of the video;
    modifying a state of the compressed images in the buffer based on a new rate of the video;
    at least one of reconsidering the selected order of transmission sending already compressed but not yet transmitted images in the buffer and deleting at least one compressed image in the buffer based on said modifying and at a time of coding a new image that is not in the buffer;
    coding the new image based on the new rate of the video; and
    wherein dependencies between the new image to be compressed and the compressed images are selected by taking into account the selected order reconsidered at the time of coding the new image.

12. The server according to claim 11, wherein the processor is further configured to select the dependencies between images and the selected order of transmission of sending the compressed images as a function of an available bandwidth of the communication network, and/or a number of packets waiting to be sent and content of the video.

13. The server according to claim 12, wherein the processor is further configured to evaluate said available bandwidth via a mechanism for controlling congestion on the communication network.

14. The server according to claim 13, wherein the 1 mechanism for controlling the congestion is of a TFRC ("TCP Friendly Rate Control") or AIMD ("Additive Increase/Multiple Decrease") type.

15. The server according to claim 11, wherein the processor is further configured to define a coding mode for the new image with or without dependency.

16. The server according to claim 15, wherein defining a coding mode with dependency further includes defining at least one possible reference image.

17. The server according to any one of claims 11 and 12-16, wherein the processor is further configured to decide to delete at least one compressed image in the buffer that has not been transmitted after a reordering of the compressed images.

18. The server according to claim 11, wherein the processor is further configured to decide to delay or bring forward a transmission of at least one compressed image.

19. The server according to 11, wherein the processor is further configured to assign to packets representing each of the compressed images are assigned a certain priority and a certain expiry time, after which the transmission of the packets representing the compressed images becomes useless, and the packets are adapted to be sent in a decreasing priority order and in an increasing expiry time order.

20. The server according to claim 11, wherein the video is coded in H.264 format.

21. A telecommunications system comprising a plurality of terminal devices connected via a telecommunications network, wherein the telecommunications system comprises at least one terminal device equipped with a server according to any one of claims 11 and 12-16.

22. A non-transitory computer-readable recording medium configured to store information readable by a computer or a microprocessor holding instructions for a computer program for carrying out the method according to any one of claims 1 and 2-6.

23. A non-transitory computer-readable recording medium storing a computer program product configured to be loaded onto a programmable apparatus, that when executed causes a computer to perform sequences of instructions for carrying out the method according to any one of claims 1 and 2-6.

* * * * *